(12) United States Patent
Hirose et al.

(10) Patent No.: US 12,227,657 B2
(45) Date of Patent: Feb. 18, 2025

(54) ACTIVE ENERGY RAY-CURABLE FLEXOGRAPHIC PRINTING INK COMPOSITION

(71) Applicant: SAKATA INX CORPORATION, Osaka (JP)

(72) Inventors: Tadashi Hirose, Osaka (JP); Takashi Asano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 913 days.

(21) Appl. No.: 17/416,135

(22) PCT Filed: Dec. 18, 2019

(86) PCT No.: PCT/JP2019/049532
§ 371 (c)(1),
(2) Date: Jun. 18, 2021

(87) PCT Pub. No.: WO2020/130016
PCT Pub. Date: Jun. 25, 2020

(65) Prior Publication Data
US 2022/0056287 A1    Feb. 24, 2022

(30) Foreign Application Priority Data

Dec. 21, 2018  (JP) ................. 2018-240284

(51) Int. Cl.
| | | |
|---|---|---|
| *C09D 11/101* | (2014.01) | |
| *C09D 11/104* | (2014.01) | |
| *C09D 11/12* | (2006.01) | |

(52) U.S. Cl.
CPC .......... *C09D 11/101* (2013.01); *C09D 11/104* (2013.01); *C09D 11/12* (2013.01)

(58) Field of Classification Search
CPC ...... C09D 11/101; C09D 11/104; C09D 11/12
See application file for complete search history.

(56) References Cited

U.S. PATENT DOCUMENTS

| | | |
|---|---|---|
| 2007/0060667 A1 | 3/2007 | Jung et al. |
| 2009/0306240 A1 | 12/2009 | Syamakumari et al. |
| 2011/0134554 A1 | 6/2011 | Matsumoto et al. |
| 2011/0218266 A1 | 9/2011 | Studer et al. |
| 2012/0142793 A1 | 6/2012 | Frey et al. |
| 2012/0321865 A1 | 12/2012 | Laksin et al. |
| 2015/0049149 A1* | 2/2015 | Makuta ................ C09D 11/101 347/102 |
| 2020/0010701 A1 | 1/2020 | Tsuji et al. |
| 2022/0056286 A1 | 2/2022 | Hishinuma et al. |

FOREIGN PATENT DOCUMENTS

| | | | |
|---|---|---|---|
| CN | 102112497 A | 6/2011 | |
| EP | 0324077 A2 * | 7/1989 | |
| EP | 2657308 A1 * | 10/2013 | .............. C08L 33/06 |
| EP | 3401370 A1 | 11/2018 | |
| JP | 2003321636 A | 11/2003 | |
| JP | 2006526678 A | 11/2006 | |
| JP | 2008138184 A | 6/2008 | |
| JP | 2009522392 A | 6/2009 | |
| JP | 2011524436 A | 9/2011 | |
| JP | 2012507571 A | 3/2012 | |
| JP | 2012510487 A | 5/2012 | |
| JP | 5335436 B2 | 11/2013 | |
| JP | 2015081264 A | 4/2015 | |
| JP | 2017137369 A | 8/2017 | |
| JP | 2018109161 A | 7/2018 | |
| JP | 2018109175 A | 7/2018 | |
| WO | 2011012560 A1 | 2/2011 | |
| WO | 2016034963 A1 | 3/2016 | |
| WO | 2018163942 A1 | 9/2018 | |
| WO | 2020138132 A1 | 7/2020 | |

OTHER PUBLICATIONS

English machine translation of EP-0324077-A2 (Year: 1989).*
Extended European Search Report (EESR) dated Aug. 8, 2022, issued for European counterpart patent application No. EP19898648.1 (6 pages).
International Search Report (ISR) mailed Feb. 18, 2020, issued for International application No. PCT/JP2019/049532. (3 pages).
A First Office Action issued by the State Intellectual Property Office of China on May 7, 2022, for Chinese counterpart application No. 201980084270.6 (6 pages).
Notification Concerning Transmittal of International Preliminary Report on Patentability (PCT/IB/326) and Notification of Transmittal of Translation of the International Preliminary Report on Patentability (PCT/IB/338) mailed Jul. 1, 2021, with International Preliminary Report on Patentability (PCT/IB/373) and Written Opinion of the International Searching Authority (PCT/ISA/237), for corresponding international application PCT/JP2019/049532 (12 pages).

* cited by examiner

*Primary Examiner* — Jennifer A Smith
*Assistant Examiner* — Jeffrey Eugene Barzach
(74) *Attorney, Agent, or Firm* — Law Office of Katsuhiro Arai

(57) ABSTRACT

An object is to constitute an active energy ray-curable flexographic printing ink composition that uses more biomass-derived components, while still maintaining such basic properties as curability, adhesion, rub resistance, scratch resistance, etc. As a solution, an active energy ray-curable flexographic printing ink composition is provided that contains a plant oil-modified polyfunctional (polyester) oligomer by 20.0 to 70.0% by mass in the ink composition and an acrylamide derivative by 20.0 to 45.0% by mass in the ink composition, and has a viscosity of 300 to 2,000 mPa·s.

4 Claims, No Drawings

ACTIVE ENERGY RAY-CURABLE FLEXOGRAPHIC PRINTING INK COMPOSITION

CROSS-REFERENCE TO RELATED APPLICATIONS

This application is the U.S. National Phase under 35 U.S.C. § 371 of International Application PCT/JP2019/049532, filed Dec. 18, 2019, which claims priority to Japanese Patent Application No. JP2018-240284, filed Dec. 21, 2018. The International Application was published under PCT Article 21 (2) in a language other than English.

TECHNICAL FIELD

The present invention relates to an active energy ray-curable flexographic printing ink composition.

BACKGROUND ART

Efforts are underway in various industries and sectors to reduce environmental impact from various angles, with the goal of protecting the global environment. For example, volatile organic compounds (VOCs) contained in paints, inks, etc., are chemical substances that cause global warming and are therefore the target of the efforts to reduce environmental impact through voluntary regulation/reduction of the use of VOCs.

In the interest of reducing VOCs, utilization of active energy ray-curable printing ink compositions that cure under ultraviolet rays, electron beam and other active energy rays is being studied. Active energy ray-curable flexographic printing ink compositions contain polymerizable compounds that polymerize when irradiated with active energy rays, and, if necessary, a polymerization initiator, etc., that expresses polymerization initiation function when irradiated with active energy rays.

Active energy ray-curable printing ink compositions can reduce environmental impact because they help curb the use of VOCs to eliminate or reduce VOC volatilization volumes. Furthermore, their ability to cure quickly (quick drying property) allows for energy saving and productivity improvement, which is why active energy ray-curable printing ink compositions have been practical choices for use in paints and inks.

In the printing industry, printed matters that have been printed by various methods cannot be forwarded for post-processing or distributed as products until the surface inks become sufficiently dry to prevent the inks from transferring to the back side of the printed matters when stacked, or from attaching to objects that come in contact with the printed matters. This explains the growing popularity of active energy ray-curable inks that can be cured (dried) instantly on the surface of printed matters when the printed matters are irradiated with an active energy ray immediately after printing.

Such active energy ray-curable inks are widely known, as described in Patent Literatures 1 and 2, for example.

Furthermore, active energy ray-curable printing ink compositions are the target of various measures designed to reduce environmental impact. Examples include, for example, development of products that can be cured (dried) with less active energy ray irradiation, and replacement of high-pressure mercury lamps, etc., that consume a lot of power and cause ozone to generate at short UV wavelengths with UV LED lamps and low-output UV lamps that are energy-efficient and reduce ozone generation.

As part of environmental impact reduction efforts, recent years have seen an adoption of biomass products that use raw materials derived from biomass, which is a recyclable resource, instead of those derived from fossil resources, and therefore prevent $CO_2$ in the environment from increasing (carbon neutral), in order to reduce greenhouse gas emissions.

For example, the printing ink industry has introduced the Ink Green Mark (IG Mark) system in an effort to reduce environmental impact by classifying printing inks into three levels of eco-friendliness according to the percentage of biomass-derived components in all components constituting the printing ink.

However, traditional active energy ray-curable inks use large amounts of polymerizable components derived from fossil resources as raw materials, which makes it difficult to bring them into compliance with the IG Mark certification standards. Additionally, obtaining biomass-derived polymerizable compounds in large volumes is difficult.

In the meantime, there have been studies of late to utilize nonedible biomass components (biomass components not for human consumption, particularly biomass components obtained from substances not for human consumption) as biomass-derived components so as not to compete with food production.

For example, Patent Literature 3 describes a possibility of using, as a printing ink, a UV-curable composition based on a urethane acrylate synthesized from a cardanol contained in cashew-nut shell liquid or other natural recyclable resource or derivative thereof. However, obtaining such urethane acrylate in large volumes is considered difficult.

BACKGROUND ART LITERATURE

Patent Literature

Patent Literature 1: Japanese Patent Laid-open No. 2017-137369
Patent Literature 2: Japanese Patent Laid-open No. 2015-081264
Patent Literature 3: Japanese Patent No. 5335436

SUMMARY OF THE INVENTION

Problems to be Solved by the Invention

The present invention was made in light of the aforementioned situation, and one object of the present invention is to provide an active energy ray-curable flexographic printing ink composition that uses more biomass-derived components, while still maintaining such basic properties as curability, adhesion, rub resistance, scratch resistance, etc.

Another object of the present invention is to provide an active energy ray-curable flexographic printing ink composition that can prevent triggering starvation and food shortage problems due to its higher ratio of biomass-derived raw materials and use of nonedible biomass. And it is also contributing significantly to the creation of a sustainable, recycling-oriented society.

Means for Solving the Problems

The inventors of the present invention found that the aforementioned objects could be achieved by using an active energy ray-curable flexographic printing ink composition as described below, and completed the present invention. To be specific, the present invention is as follows.

1. An active energy ray-curable flexographic printing ink composition which comprises a plant oil-modified polyfunctional (polyester) oligomer by 20.0 to 70.0% by mass in the ink composition and an acrylamide derivative by 20.0 to 45.0% by mass in the ink composition, and has a viscosity of 300 to 2,000 mPa·s.

2. The active energy ray-curable flexographic printing ink composition according to 1, which comprises a wax of 8.0 μm or smaller in average particle size by 1.0 to 5.0% by mass in the ink composition.

3. The active energy ray-curable flexographic printing ink composition according to 1 or 2, which comprises a surface-adjusting agent by 0.01 to 1.00% by mass in the ink composition.

4. The active energy ray-curable flexographic printing ink composition according to any one of 1 to 3, which comprises a colorant.

Effects of the Invention

According to the present invention, an active energy ray-curable flexographic printing ink composition maintaining such basic properties as curability, adhesion, scratch resistance, etc., can be obtained, and it can also have a higher ratio of biomass-derived raw materials.

MODE FOR CARRYING OUT THE INVENTION

The active energy ray-curable flexographic printing ink composition proposed by the present invention is printed on labels, etc. This composition is explained in detail below.
(Colorant)

The active energy ray-curable flexographic printing ink composition proposed by the present invention may contain a colorant of corresponding hue, to provide an active energy ray-curable flexographic printing ink composition of corresponding color. Also, the composition may be made colorless and clear, or colored and clear, when it contains no colorant or its content of colorant is reduced.

For the colorant used in the active energy ray-curable flexographic printing ink composition proposed by the present invention, any known pigment or dye used in flexographic ink compositions may be used without limitation; from the viewpoint of lightfastness, however, pigments such as organic pigments and inorganic pigments are preferred.

To be specific, inorganic pigments include colored pigments (including pigments having white, black and other achromatic colors) such as titanium oxide, red iron oxide, antimony red, cadmium yellow, cobalt blue, Prussian blue, ultramarine blue, iron black, chrome oxide green, carbon black, graphite, etc., as well as extender pigments such as calcium carbonate, kaolin, clay, barium sulfate, aluminum hydroxide, talc, etc. Also, organic pigments include dye lake pigments and azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based and indanethrone-based pigments, and the like.

When preparing an active energy ray-curable flexographic printing ink composition of corresponding color that contains a colorant of corresponding hue, preferably the concentration of the colorant in the active energy ray-curable flexographic printing ink composition is 1 to 60% by mass.

(Pigment Dispersant/Pigment Dispersing Resin)

If the active energy ray-curable flexographic printing ink composition proposed by the present invention adopts a pigment as a colorant, a pigment dispersant and/or pigment dispersing resin may be compounded.

For the pigment dispersant, one or more types selected from the group that consists of known nonionic surfactants, anionic surfactants, cationic surfactants, and amphoteric surfactants may be used.

Among these surfactants, one or more types selected from the group that consists of silicon-based surfactants (such as polyether-modified silicon oils, polyester-modified polydimethyl siloxanes, polyester-modified methyl alkyl polysiloxanes, etc.), fluorine-based surfactants, oxyalkylene ether-based surfactants, acetylene glycol-based surfactants, phosphorus-based surfactants, sulfonic acid-based surfactants, etc., may be used, for example.

Also, for the pigment dispersing resin, one or more types selected from the group that consists of polymeric dispersants (such as carbodiimide-based, polyester-based, polyamine-based, polyester amine-based, polyurethane-based, and fatty acid amine-based dispersants, as well as polyacrylate-based, polycaprolactone-based, polysiloxane-based, multichain-type polymeric nonionic and polymeric ionic dispersants, etc.), and the like, may be used.

If the active energy ray-curable flexographic printing ink composition contains a pigment dispersant or pigment-dispersing resin, preferably it is contained by 1 to 200% by mass relative to the quantity of all pigments used that represents 100% by mass.

(Plant Oil-Modified Polyfunctional (Polyester) Oligomer)

For the plant oil-modified polyfunctional (polyester) oligomer, any bifunctional, tetrafunctional, or hexafunctional polyester oligomer modified by a plant oil, which has at least two (meth)acrylate groups in its molecule, may be used without limitation. This way, the biomass content of the active energy ray-curable flexographic printing ink composition can be increased, which is desired.

It should be noted that the plant oil used for modification is a term including the various fatty acid esters contained in the plant oil, fatty acids obtained by hydrolyzing these various fatty acid esters, and the like. For the plant oil, soybean oil, canola oil, sunflower oil, tall oil, corn oil, etc., may be used. Among these, preferably tall oil, which is nonedible, is selected as the plant oil used for modification.

Among the polyfunctional (polyester) oligomers, hexafunctional plant oil modified (polyester) oligomers are preferred, where, preferably one or more types selected from the group that consists of EBECRYL 450 and hexafunctional polyester acrylates modified by tall oil fatty acids (such as AgiSyn 716, etc.), will be used, for example.

The plant oil-modified polyfunctional (polyester) oligomer is contained by 20.0 to 70.0% by mass in the active energy ray-curable flexographic printing ink composition proposed by the present invention.

Particularly when making the active energy ray-curable flexographic printing ink composition nonclear, the plant oil-modified polyfunctional (polyester) oligomer is contained by preferably 20.0 to 60.0% by mass, or more preferably 20.0 to 45.0% by mass, or yet more preferably 30.0 to 40.0% by mass.

Also, when making the active energy ray-curable flexographic printing ink composition clear, the plant oil-modified polyfunctional (polyester) oligomer is contained by preferably 25.0 to 70.0% by mass, or more preferably 30.0 to 65.0% by mass, or yet more preferably 35.0 to 60.0% by mass.

This way, an active energy ray-curable flexographic printing ink composition offering excellent curability, adhesion, rub resistance, and scratch resistance, and also high in biomass content, can be obtained.

(Acrylamide Derivative)

For the acrylamide derivative used under the present invention, one or more types selected from the group that consists of acrylamide derivatives having active energy ray curability, such as (meth)acrylamide, N-methylol(meth)acrylamide, diacetone (meth)acrylamide, N,N-dimethyl (meth)acrylamide, N,N-diethyl (meth)acrylamide, N-isopropyl (meth)acrylamide, (meth)acryloyl morpholine (ACMO), N,N-dimethylaminopropyl (meth)acrylamide, N,N-diethylaminopropyl (meth)acrylamide, etc., may be used, for example.

The content of the acrylamide derivative in the active energy ray-curable flexographic printing ink composition is 20.0 to 45.0% by mass. It is preferably 22.0 to 45.0% by mass, or more preferably 24.0 to 42.0% by mass, or yet more preferably 24.0 to 35.0% by mass.

If the content of the acrylamide derivative is under 20.0% by mass, the curability of the resulting active energy ray-curable flexographic printing ink composition may drop. If it exceeds 45.0% by mass, on the other hand, the rub resistance, scratch resistance, etc. may be deteriorated.

(Wax)

For the wax, one with an average particle size of 8.0 μm or smaller may be used in the interest of improving scratch resistance.

To be specific, any of beeswax, lanoline wax, whale wax, candelilla wax, carnauba wax, rice wax, sumac wax, jojoba oil, and other animal/plant-based waxes, montan wax, ozocerite, ceresin, paraffin wax, microcrystalline wax, petrolatum, and other mineral or petroleum-based waxes, Fischer-Tropsch wax, polyethylene wax, oxidized polyethylene wax, oxidized polypropylene wax, and other synthetic hydrocarbon-based waxes, montan wax derivative, paraffin wax derivative, microcrystalline wax derivative, and other modified waxes, hardened castor oil, hardened castor oil derivative, and other hydrogenated waxes, polytetrafluoroethylene wax, etc., with an average particle size of 8.0 μm or smaller, or preferably 6.0 μm or smaller, or more preferably 4.0 μm or smaller, or yet more preferably 2.0 μm or smaller, may be used. An average particle size of 2.0 μm or smaller leads to better scratch resistance.

Also, any average particle size may be selected for the wax to be used, as deemed appropriate, according to the viscosity of the active energy ray-curable flexographic printing ink composition or anilox line count of the flexographic printing machine.

The wax content in the active energy ray-curable flexographic printing ink composition is preferably in a range of 0.5 to 5.0% by mass, or more preferably in a range of 1.5 to 4.5% by mass.

If the wax content is lower than 0.5% by mass, the scratch resistance tends to drop; if it is higher than 5.0% by mass, on the other hand, the workability tends to drop because the turn rolls get soiled, etc.

(Photopolymerization Initiator)

The active energy ray-curable flexographic printing ink composition may contain a known photopolymerization initiator.

The photopolymerization initiator is not limited in any way so long as it can generate radicals or other active species when irradiated with an active energy ray to cause the active energy ray-curable flexographic printing ink composition to start polymerizing; for example, one or more types selected from the group that consists of redox initiator, thermopolymerization initiator, photopolymerization initiator, etc., may be used. It should be noted that, if the active energy ray-curable flexographic printing ink composition proposed by the present invention is to be cured with an electron beam, no photopolymerization initiator needs to be contained.

A redox initiator demonstrates polymerization initiation function through an oxidation-reduction reaction under mild conditions based on a combination of a peroxide and a reducing agent.

A thermopolymerization initiator or photopolymerization initiator each demonstrates polymerization initiation function by generating radicals when irradiated with an active energy ray (infrared ray, ultraviolet rays, LED, electron beam, etc.).

While any polymerization initiator may be selected as deemed appropriate according to the purpose of use, objective, etc., and normally use of a photopolymerization initiator is preferred, a redox initiator having relatively low toxicity may be used, instead of a thermopolymerization initiator or photopolymerization initiator having high potential toxicity, when toxicity must be considered.

Among these, preferably a radical photopolymerization initiator having optical absorption properties across wavelengths of 450 to 300 nm and being capable of manifesting a function to initiate curing reaction (radical polymerization) under light of wavelengths in this range, is used, as it can achieve good curability under ultraviolet rays from a light-emitting diode (LED) light source.

Among radical photopolymerization initiators, one or more types selected from the group that consists of acylphosphine oxide-based compounds, triazine-based compounds, aromatic ketone-based compounds, aromatic onium salt-based compounds, organic peroxides, thioxanthone-based compounds, thiophenyl-based compounds, anthracene-based compounds, hexaaryl-bisimidazole-based compounds, ketoxime ester-based compounds, borate-based compounds, azinium-based compounds, metallocene-based compounds, active ester-based compounds, halogenated hydrocarbon-based compounds, alkylamine-based compounds, iodonium salt-based compounds, sulfonium salt-based compounds, etc., may be used, for example.

Among acylphosphine oxide-based compounds, one or more types selected from the group that consists of 2,4,6-trimethylbenzoyl-diphenyl-phosphine oxide, bis(2,4,6-trimethylbenzoyl)-phenylphosphine oxide, etc., may be used, for example.

Among triazine-based compounds, one or more types selected from the group that consists of 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc., may be used, for example.

Furthermore, one or more types selected from the group that consists of benzophenone, diethylthioxanthone, 2-methyl-1-(4-methylthio)phenyl-2-morpholinopropane-1-one, 4-benzoyl-4'-methyldiphenyl sulfide, 1-chloro-4-propoxythioxanthone, isopropylthioxanthone, 2-hydroxy-2-methyl-1-phenylpropane-1-one, 1-hydroxycyclohexylphenylketone, 1-[4-(2-hydroxyethoxy)-phenyl]-2-hydroxy-2-methyl-1-propane-1-one, 2,2- dimethyl-2-hydroxyacetophenone, 2,2-dimethoxy-2-phenylacetophenone, 2-benzyl-2-dimethylamino-1-(morpholinophenyl)-butane-1-one, etc., may be used, for example.

For these photopolymerization initiators, IRGACURE 907, 369, 184, 379, 819, etc., manufactured by BASF SE, TPO, DETX, etc., manufactured by Lamberti S.P.A., TAZ-204, etc., manufactured by Midori Kagaku Co., Ltd., may be used, for example.

The content of the photopolymerization initiator in the ink composition may be determined as deemed appropriate according to the components in the active energy ray-curable flexographic printing ink composition, among others; for example, it may be contained by 0.1 to 25.0% by mass, or preferably 0.1 to 15.0% by mass, or more preferably 1.0 to 15.0% by mass, in the active energy ray-curable flexographic printing ink composition.

Keeping the content of the photopolymerization initiator in the ink composition to the aforementioned range ensures sufficient curability, good internal curability, and good cost performance, of the ink composition at the same time, which is desired.

(Other Polymerizable Compounds)
(Compounds Having One Ethylenic Unsaturated Bond)

The active energy ray-curable flexographic printing ink composition proposed by the present invention may use, as a polymerizable compound other than the foregoing, any known compound having one ethylenic unsaturated bond.

Such compound may be any of the compounds listed below, among others, for example.

—Unsaturated Carboxylic Acid-Based Compounds—

Unsaturated carboxylic acid-based compounds include, for example, (meth)acrylic acid, itaconic acid, crotonic acid, isocrotonic acid, fumaric acid, maleic acid, and other unsaturated carboxylic acids, as well as salts thereof and anhydrides thereof.

—Alkyl (Meth)Acrylate-Based Compounds—

Alkyl (meth)acrylate-based compounds include, for example, methyl (meth)acrylate, ethyl (meth)acrylate, propyl (meth)acrylate, isopropyl (meth)acrylate, n-butyl (meth)acrylate, i-butyl (meth)acrylate, t-butyl acrylate, amyl (meth)acrylate, isoamyl (meth)acrylate, hexyl (meth)acrylate, 2-ethylhexyl (meth)acrylate, octyl (meth)acrylate, decyl (meth)acrylate, dodecyl (meth)acrylate, isooctyl (meth)acrylate, lauryl (meth)acrylate, stearyl (meth)acrylate, isostearyl (meth)acrylate, isodecyl (meth)acrylate, isomyristyl (meth)acrylate, octadecyl (meth)acrylate, dicyclopentanyl (meth)acrylate, tridecyl (meth)acrylate, nonyl (meth)acrylate, hexadecyl (meth)acrylate, myristyl (meth)acrylate, isobornyl (meth)acrylate, cyclohexyl (meth)acrylate, norbornyl (meth)acrylate, dicyclopentenyl (meth)acrylate, dicyclopentenyloxyethyl (meth)acrylate, 1-adamantyl (meth)acrylate, 3,5,5-trimethylcyclohexyl acrylate, 4-t-butylcyclohexyl (meth)acrylate, benzyl (meth)acrylate, etc.

—Hydroxyl Group-Containing (Meth)Acrylate-Based Compounds—

Hydroxyl group-containing (meth)acrylate-based compounds include, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-methoxypropyl (meth)acrylate, 2-hydroxy-3-butoxypropyl (meth)acrylate, diethylene glycol mono(meth)acrylate, triethylene glycol mono(meth)acrylate, polyethylene glycol mono (meth)acrylate, dipropylene glycol mono(meth)acrylate, polypropylene glycol mono (meth)acrylate, 1,6-hexanediol mono (meth)acrylate, glycerin mono (meth)acrylate, 2-hydroxy-3-chloropropyl (meth)acrylate, 2-hydroxy-3-phenoxypropyl (meth)acrylate, 2-hydroxy-3-allyloxypropyl (meth)acrylate, 2-(meth)acryloyloxyethyl-2-hydroxypropyl phthalate, 2-ethylhexyl EO-modified (meth)acrylate, o-phenylphenol EO-modified acrylate, p-cumylphenol EO-modified (meth)acrylate, nonylphenol EO-modified (meth)acrylate and other (poly) alkylene glycol-modified (meth)acrylates, etc.

—Halogen-Containing (Meth)Acrylate-Based Compounds—

Halogen-containing (meth)acrylate-based compounds include, for example, trifluoromethyl (meth)acrylate, 2,2,2-trifluoroethyl (meth)acrylate, 2,2,3,3-tetrafluoropropyl (meth)acrylate, 1H-hexafluoroisopropyl (meth)acrylate, 1H,1H,5H-octafluoropentyl (meth)acrylate, 1H,1H,2H,2H-heptadecafluorodecyl (meth)acrylate, 2,6-dibromo-4-butylphenyl (meth)acrylate, 2,4,6-tribromophenoxyethyl (meth)acrylate, 2,4,6-tribromophenol-3-EO (ethylene oxide) adduct (meth)acrylate, etc.

—Ether Group-Containing (Meth)Acrylate-Based Compounds—

Ether group-containing (meth)acrylate-based compounds include, for example, 1,3-butylene glycol methyl ether (meth)acrylate, methoxytriethylene glycol (meth)acrylate, methoxydipropylene glycol (meth)acrylate, methoxytripropylene glycol (meth)acrylate, methoxypolypropylene glycol (meth)acrylate, ethoxydiethylene glycol (meth)acrylate, ethyl carbitol (meth)acrylate, 2-ethylhexyl carbitol (meth)acrylate, tetrahydrofurfuryl (meth)acrylate, cresylpolyethylene glycol (meth)acrylate, 2-(vinyloxyethoxy)ethyl (meth)acrylate, phenoxyethyl (meth)acrylate, p-nonylphenoxyethyl (meth)acrylate, p-nonylphenoxypolyethylene glycol (meth)acrylate, glycidyl (meth)acrylate, phenoxydiethylene glycol (meth)acrylate, phenoxy-polyethylene glycol (meth)acrylate, hexaethylene glycol monophenyl ether mono(meth)acrylate, diethylene glycol monobutyl ether acrylate, dipropylene glycol monomethyl ether (meth) acrylate, 3-methoxybutyl (meth)acrylate, methoxydiethylene glycol (meth)acrylate, methoxypropylene glycol (meth) acrylate, methoxypolyethylene glycol (meth)acrylate (number of EO repeating units being 400, 700, etc.), 2-(2-ethoxyethoxy)ethyl (meth)acrylate, 2-ethoxyethyl (meth) acrylate, 2-methoxyethyl (meth)acrylate, 3-methoxybutyl acrylate, ethoxyethyl acrylate, ethoxyethoxyethyl (meth) acrylate, butoxyethyl (meth)acrylate, alkoxylated 2-phenoxyethyl (meth)acrylate (ethoxylated 2-phenoxyethyl (meth)acrylate, propoxylated 2-phenoxyethyl (meth)acrylate, etc.), alkoxylated nonylphenyl (meth)acrylate (ethoxylated (4) nonylphenol acrylate, etc.), 2-phenoxyethyl (meth) acrylate, paracumylphenoxyethylene glycol (meth)acrylate, methylphenoxyethyl acrylate, ethoxylated succinic acid (meth)acrylate, ethoxylated tribromophenyl acrylate, ethoxylated nonylphenyl (meth)acrylate, and other alkoxy and/or phenoxy-based (meth)acrylates, etc.

—Carboxyl Group-Containing (Meth)Acrylate-Based Compounds—

Carboxyl group-containing (meth)acrylate-based compounds include, for example, ß-carboxylethyl (meth)acrylate, succinic acid monoacryloyloxyethyl ester, ω-carboxypolycaprolactone mono(meth)acrylate, 2-(meth)acryloyloxyethyl hydrogen phthalate, 2-(meth)acryloyloxypropyl hydrogen phthalate, 2-(meth)acryloyloxypropyl hexahydro-hydrogen phthalate, 2-(meth)acryloyloxypropyl tetrahydro-hydrogen phthalate, etc.

—Vinyl Ether Group-Containing (Meth)Acrylate-Based Compounds—

Vinyl ether group-containing (meth)acrylate-based compounds include, for example, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 3-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 5-vinyloxypentyl (meth)acrylate, 6-vinyloxyhexyl (meth)acrylate, 4-vinyloxymethylcyclohexylmethyl (meth)acrylate, 3-vinyloxymethlycyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, etc.

Other (Meth)Acrylate-Based Compounds—

Other (meth)acrylate-based compounds include, for example, N,N-dimethylaminoethyl (meth)acrylate, N,N-dimethylaminopropyl (meth)acrylate, morpholinoethyl (meth)acrylate, trimethylsiloxyethyl (meth)acrylate, diphenyl-2-(meth)acryloyloxyethyl phosphate, 2-(meth)acryloyloxyethyl acid phosphate, caprolactone-modified 2-(meth)acryloyloxyethyl acid phosphate, 2-hydroxy-1-(meth)acryloxy-3-methacryloxypropane, acryloxyethyl phthalate, 2-(meth)acryloyloxyethyl-2-hydroxyethyl phthalate, 2-(meth)acryloyloxypropyl phthalate, tricyclodecane monomethylol(meth)acrylate, (meth)acrylic acid dimer, diethylaminoethyl (meth)acrylate, 2-(meth)acryloyloxyethyl succinic acid, 2-(meth)acryloyloxyethyl hexahydrophthalic acid, 2-ethylhexyl-diglycol (meth)acrylate, aminoethyl (meth)acrylate, ethyl carbitol acrylate, ethyl diglycol acrylate, quaternary salt of dimethylaminoethyl acrylate benzyl chloride, tribromophenyl (meth)acrylate, 1,4-cyclohexanedimethanol mono(meth)acrylate, cresol (meth)acrylate, trimethylolpropane formal (meth)acrylate, neopentyl glycol (meth)acrylic acid benzoate ester, (2-methyl-2-ethyl-1,3-dioxolan-4-yl)methyl (meth)acrylate, 1-(meth)acryloyl piperidin-2-one, 1,4-dioxaspiro[4,5]deci-2-ylmethyl 2-(meth)acrylate, N-(meth)acryloyloxyethyl hexahydrophthalimide, γ-butyrolactone (meth)acrylate, caprolactone-modified tetrahydro-furfuryl acrylate, imide acrylate, vinyl (meth)acrylate, maleimide, etc.

—Styrene-Based Compounds—

Styrene-based compounds include, for example, styrene, vinyl toluene, p-hydroxystyrene, p-chlorostyrene, p-bromostyrene, p-methyl styrene, p-methoxystyrene, p-t-butoxystyrene, p-t-butoxycarbonylstyrene, p-t-butoxycarbonyloxystyrene, 2,4-diphenyl-4-methyl-1-pentene, divinylbenzene, etc.

—N-vinyl-Based Compounds—

N-vinyl-based compounds include, for example, N-vinyl pyrrolidone, N-vinyl formamide, N-vinyl acetoamide, N-vinyl-2-caprolactam, N-vinyl carbazole, etc.

—Allylate-Based Compounds—

Allylate-based compounds include, for example, allyl glycidyl ether, diallyl phthalate, triallyl trimellitate, isocyanuric acid triallylate, etc.

—Other Compounds Having One Ethylenic Unsaturated Bond—

As a compound having one ethylenic unsaturated bond, any of "other compounds having one ethylenic unsaturated bond" excluding the aforementioned compounds, may be used.

Such compounds include, for example, vinyl acetate, vinyl monochloroacetate, vinyl benzoate, vinyl pivalate, vinyl butylate, vinyl laurate, divinyl adipate, vinyl crotonate, vinyl 2-ethylhexanoate, three-membered ring compounds (such as vinyl cyclopropanes, 1-phenyl-2-vinylcyclopropanes, 2-phenyl-3-vinyloxiranes, 2,3-divinyloxiranes, etc.), cyclic ketene acetals (such as 2-methylene-1,3-dioxepane, dioxolanes, 2-methylene-4-phenyl-1,3-dioxepane, 4,7-dimethyl-2-methylene-1,3-dioxepane, 5,6-benzo-2-methylene-1,3-dioxepane, etc.), etc.

—Compounds Having Two Ethylenic Unsaturated Bonds (Excluding Plant Oil-modified Polyfunctional (Polyester) Oligomer)—

The active energy ray-curable flexographic printing ink composition proposed by the present invention may use any known compound having two ethylenic unsaturated bonds.

For such compound having two ethylenic unsaturated bonds, any of known compounds having two ethylenic unsaturated bonds may be used without limitation, including, for example, ethylene glycol di(meth)acrylate, diethylene glycol di(meth)acrylate, triethylene glycol di(meth)acrylate, polyethylene glycol di(meth)acrylate, polyethylene glycol (100) di(meth)acrylate, polyethylene glycol (400) di(meth)acrylate, polyethylene glycol (700) di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, cyclohexanedimethanol di(meth)acrylate, dicyclopentanyl di(meth)acrylate, dimethylol octane di(meth)acrylate, dimethylol-tricyclodecane di(meth)acrylate, dimethylol propane di(meth)acrylate, tetraethylene glycol di(meth)acrylate, tricyclodecane dimethylol di(meth)acrylate, tris (2-hydroxyethyl) isocyanurate di(meth)acrylate, hydroxypivalic acid neopentyl glycol di(meth)acrylate, polytetramethylene glycol di(meth)acrylate, 1,3-butylene glycol di(meth)acrylate, 1,4-dimethyl-2,4-pentanediol di(meth)acrylate, 1,4-butanediol di(meth)acrylate, 1,5-dimethyl-2,5-hexanediol di(meth)acrylate, 1,5-pentanediol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2,4-diethyl-1,5-pentanediol di(meth)acrylate, 2-methyl-1,3-butylene glycol di(meth)acrylate, 2-n-butyl-2-ethyl-1,3-propanediol di(meth)acrylate, tricyclodecane dimethylol dicaprolactonate di(meth)acrylate, dimethylol dicyclopentane di(meth)acrylate, 1,6-hexanediol bis(2-hydroxy-3-(meth)acryloyloxypropyl) ether, bis(4-(meth)acryloxypolyethoxyphenyl) propane, pentaerythritol di(meth)acrylate, pentaerythritol di(meth)acrylate monostearate, pentaerythritol di(meth)acrylate monobenzoate, glycerin di(meth)acrylate, 2-hydroxy-1,3-di(meth)acryloxypropane, diethylene glycol divinyl ether, cyclohexanedimethanol divinyl ether, dipropylene glycol divinyl ether, triethylene glycol divinyl ether, trimethylolpropane divinyl ether, butanediol divinyl ether, propylene glycol divinyl ether, hexanediol divinyl ether, trimethylolpropane diallyl ether, vinyloxyalkyl (meth)acrylate, vinyloxyethoxyethyl (meth)acrylate, N,N'-methylene-bis-acrylamide, bisphenol A di(meth)acrylate, bisphenol F di(meth)acrylate, hydroxypivalyl hydroxypivalate di(meth)acrylate, hydrogenated bisphenol A di(meth)acrylate, hydrogenated bisphenol F di(meth)acrylate, etc.

Also, examples include, alkoxylates (such as ethoxylates, propoxylates, butoxylates, etc.) of the aforementioned compounds having two ethylenic unsaturated bonds, such as ethoxylated 1,6-hexanediol di(meth)acrylate, ethoxylated neopentyl glycol di(meth)acrylate, propoxylated neopentyl glycol di(meth)acrylate, and the like.

Also, one or more types of an alkylene oxide-modified product (such as ethylene oxide, propylene oxide, etc.) of any of the aforementioned compounds having two ethylenic unsaturated bonds, such as one or more types selected from the group that consists of ethylene oxide (EO)-modified bisphenol A di(meth)acrylate, propylene oxide (PO)-modified bisphenol A di(meth)acrylate, EO-modified hydrogenated bisphenol A di(meth)acrylate, PO-modified hydrogenated bisphenol A di(meth)acrylate, EO-modified bisphenol F di(meth)acrylate, PO-modified bisphenol F di(meth)acrylate, EO-modified tetrabromo-bisphenol A di(meth)acrylate, bisphenol A tetraethylene oxide adduct di(meth)acrylate, bisphenol F tetraethylene oxide adduct di(meth)acrylate, bisphenol S tetraethylene oxide adduct di(meth)acrylate, hydrogenated bisphenol A tetraethylene oxide adduct di(meth)acrylate, hydrogenated bisphenol F tetraethylene oxide adduct di(meth)acrylate, EO-modified neopentyl glycol di(meth)acrylate, PO-modified neopentyl glycol di(meth)acrylate, (meth)acrylic acid polyethylene glycol monovinyl ether, (meth)acrylic acid polypropylene glycol monovinyl ether, neopentyl glycol PO (propylene oxide)-modified di(meth)acrylate, and isocyanuric acid EO-modified di(meth)acrylate, may be used, for example.

Also, one or more types of a caprolactone-modified product of any of the aforementioned compounds having two ethylenic unsaturated bonds, such as one or more types selected form the group that consists of bisphenol A tetraethylene oxide adduct dicaprolactonate di(meth)acrylate, bisphenol F tetraethylene oxide adduct dicaprolactonate di(meth)acrylate, hydroxypivalyl hydroxypivalonate di(meth)acrylate, and caprolactone adduct di(meth)acrylate of hydroxypivaric acid neopentyl glycol ester, may be used, for example.

—Compounds Having Three Ethylenic Unsaturated Bonds (Excluding Plant Oil-Modified Polyfunctional (Polyester) Oligomer)—

The active energy ray-curable flexographic printing ink composition proposed by the present invention may contain any known compound having three ethylenic unsaturated bonds.

For such compound having three ethylenic unsaturated bonds, any of known compounds having three ethylenic unsaturated bonds may be used without limitation, including, for example, glycerin tri(meth)acrylate, tetramethylol methane triacrylate, tetramethylol propane tri(meth)acrylate, tris(2-hydroxyethyl)isocyanurate tri(meth)acrylate, trimethylol ethane tri(meth)acrylate, trimethylol octane tri(meth)acrylate, trimethylol propane tri(meth)acrylate, trimethylol propane trivinyl ether, trimethylol hexane tri(meth)acrylate, pentaerythritol tri(meth)acrylate, pentaerythritol triallyl ether, pentaerythritol trivinyl ether, 1,3,5-tri(meth)acryloylhexahydro-s-triazine, dipentaerythritol tri(meth)acrylate tripropionate, isocyanuric acid tri(meth)acrylate, tris(acryloyloxy)phosphate, etc.

Also included are ethoxylated, propoxylated, butoxylated, or other alkoxylated products, ethylene oxide-, propylene oxide-, or other alkylene oxide-modified products, and caprolactone-modified products, of the aforementioned trifunctional monomers, such as ethoxylated trimethylol propane tri(meth)acrylate, propoxylated trimethylol propane tri(meth)acrylate, glycerin propoxytri(meth)acrylate, trimethylol propane tricaprolactonate tri(meth)acrylate, glycerin PO-modified tri(meth)acrylate, trimethylol propane PO-modified tri(meth)acrylate, isocyanuric acid EO-modified tri(meth)acrylate, isocyanuric acid EO-modified ε-caprolactone-modified tri(meth)acrylate, caprolactone-modified trimethylol propane tri(meth)acrylate, etc.

—Compounds Having Four or More Ethylenic Unsaturated Bonds (Excluding Plant Oil-Modified Polyfunctional (Polyester) Oligomer)—

The active energy ray-curable flexographic printing ink composition proposed by the present invention may use any known compound having four or more ethylenic unsaturated bonds.

For such compound having four or more ethylenic unsaturated bonds, any of known compounds having four or more ethylenic unsaturated bonds may be used without limitation, including, for example, compounds having four ethylenic unsaturated bonds, compounds having five ethylenic unsaturated bonds, compounds having six ethylenic unsaturated bonds, and compounds having seven or more ethylenic unsaturated bonds.

Compounds having four or more ethylenic unsaturated bonds include, for example, diglycerin tetra(meth)acrylate, ditrimethylol ethane tetra(meth)acrylate, ditrimethylol octane tetra(meth)acrylate, ditrimethylol butane tetra(meth)acrylate, ditrimethylol propane tetra(meth)acrylate, ditrimethylol propane tetracaprolactonate tetra(meth)acrylate, ditrimethylol hexane tetra(meth)acrylate, trimethylol propane tetra(meth)acrylate, pentaerythritol tetra(meth)acrylate, pentaerythritol tetraallyl ether, pentaerythritol tetracaprolactonate tetra(meth)acrylate, pentaerythritol tetravinyl ether, dipentaerythritol tetra(meth)acrylate, tetramethylol methane tetra(meth)acrylate, oligoester tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, tripentaerythritol polyalkylene oxide hepta(meth)acrylate, tripentaerythritol octa(meth)acrylate, etc.

Also included are ethoxylated, propoxylated, butoxylated, or other alkoxylated products, ethylene oxide-, propylene oxide-, or other alkylene oxide-modified products, and caprolactone-modified products, of the aforementioned tetra or more functional monomers, such as ethylene oxide-modified pentaerythritol tetra(meth)acrylate, ethoxylated pentaerythritol tetra(meth)acrylate, etc.

<Epoxylated Plant Oil (Meth)Acrylate Compounds>

The active energy ray-curable flexographic printing ink composition proposed by the present invention may contain any known epoxylated plant oil (meth)acrylate compound. Epoxylated plant oil (meth)acrylates are derived from plant oils and thus can increase the biomass component quantity in the active energy ray-curable flexographic printing ink composition.

Epoxylated plant oil (meth)acrylate compounds are obtained by (meth)acrylic-modifying epoxylated plant oils, and include, compounds that are each obtained by ring-opening-addition-polymerizing a (meth)acrylic acid with the epoxy group of an epoxylated vegetable oil produced by epoxylating the double bond of an unsaturated vegetable oil with peracetic acid, peroxybenzoic acid or other oxidizing agent, for example.

<Oligomers or Polymers (Excluding Vegetable Oil-Modified Polyfunctional (Polyester) Oligomer>

The active energy ray-curable flexographic printing ink composition proposed by the present invention may contain any known polymer or oligomer having ethylenic unsaturated bond.

Polymers or oligomers having ethylenic unsaturated bond include those having one or more ethylenic unsaturated bonds of one or more types selected from the group that consists of (meth)acryloyl groups, vinyl groups, etc.

Polymers or oligomers having ethylenic unsaturated bond include, for example, polydiallyl phthalate, neopentyl glycol oligo(meth)acrylate, 1,4-butanediol oligo(meth)acrylate, 1,6-hexanediol oligo(meth)acrylate, trimethylol propane oligo(meth)acrylate, pentaerythritol oligo(meth)acrylate, urethane (meth)acrylate, polyester (meth)acrylate, epoxy(meth)acrylate, rosin-modified epoxy(meth)acrylate, unsaturated polyesters, polyether (meth)acrylate, acrylic-based resins having unreacted unsaturated groups, unsaturated polyethers, unsaturated polyamides, unsaturated polyurethanes, acrylic-modified phenol-based resins, acrylated amine compound oligomers, etc.

(Commercial Products)

Commercial products of compounds with ethylenic unsaturated bond other than the aforementioned compounds include, for example, "Light Acrylate," "Light Ester," "Epoxy Ester," "Urethane Acrylate," and "High-functional Oligomer" series manufactured by Kyoeisha Chemical Co., Ltd., "NK Ester" and "NK Oligo" series manufactured by Shin-Nakamura Chemical Co., Ltd., "Fancryl" series manufactured by Hitachi Chemical Co., Ltd., "Aronix" series manufactured by Toagosei Co., Ltd., "Functional Monomer" series manufactured by Daihachi Chemical Industry Co., Ltd., "Special Acrylic Monomer" series manufactured by Osaka Organic Chemical Industry Ltd., "Acryester" and "Diabeam Oligomer" series manufactured by Mitsubishi Rayon Co., Ltd., "Kayarad" and "Kayamer" series manufactured by Nippon Kayaku Co., Ltd., "(Meth)acrylic Acid/Methacrylic Acid Ester Monomer" series manufactured by Nippon Shokubai Co., Ltd., "Nichigo-UV Shikoh Urethane Acrylate Oligomer" series manufactured by Nippon Synthetic Chemical Industry Co., Ltd., "Carboxylic Acid Vinyl Ester Monomer" series manufactured by Japan Vam & Poval Co., Ltd., "Functional Monomer" series manufactured by Kohjin Film & Chemicals Co., Ltd., "EBECRYL," "ACA," "KRM," "IRR," "RDX," and "OTA" series manufactured by Daicel-Allnex Ltd., "CN" and "SR" series manufactured by Arkema S.A., "Laromer" series manufactured by BASF SE, "Photomer" series manufactured by IGM Resins BV, "Art Resin" series manufactured by Negami Chemical Industrial Co., Ltd., "Blemmer" series manufactured by NOF Corporation, "New Frontier" series manufactured by DKS Co., Ltd., "Miramer" series manufactured by Miwon Specialty Chemical Co., Ltd., "AgiSyn" series manufactured by DSM-Agi Corporation, etc.

The compound having ethylenic unsaturated bond may be contained by 0 to 80.0% by mass, or preferably no more than 45.0% by mass, in the active energy ray-curable flexographic printing ink composition.

(Other Resins)

As other resins, any known resin may be used without limitation according to the properties to be added to the active energy ray-curable flexographic printing ink composition, especially appropriate viscoelasticity properties, and printing properties when it constitutes an ink composition, for example.

Among other resins, one or more types selected from the group that consists of acrylic-based resin, polyester-based resin, styrene-based resin, polyolefin-based resin, epoxy-based resin, polyurethane-based resin, phenol-based resin, rosin-based resin, block polymer, graft polymer (core-shell polymer), acrylic-modified phenol-based resin, rosin-modified phenol-based resin, rosin-modified maleic acid-based resin, rosin-modified alkyd-based resin, rosin-modified petroleum-based resin, rosin ester-based resin, fatty acid-modified rosin-based resin, petroleum-based resin-modified phenol-based resin, alkyd-based resin, plant oil-modified alkyd-based resin, petroleum-based resin, hydrocarbon-based resin (polybutene, polybutadiene, etc.), fluororesin (tetrafluoroethylene (PTFE) resin wax, etc.), etc., may be used, for example.

In particular, preferably one or more types selected from the group that consists of acrylic-based resin (acrylic acid ester-styrene copolymer-based resin, etc.), styrene-based resin (styrene-acrylic acid ester copolymer-based resin, etc.), rosin-modified phenol-based resin, rosin-modified maleic acid-based resin, rosin-modified alkyd-based resin, rosin ester-based resin, fatty acid-modified rosin-based resin, alkyd-based resin, and plant oil-modified alkyd-based resin, may be used.

Among these resins, one with a weight-average molecular weight of 500 to 300,000 is preferred. Also, preferably its acid value is 1 to 100 mgKOH/g from the viewpoint of, for example, achieving quick drying property when irradiated with an active energy ray.

In the active energy ray-curable flexographic printing ink composition proposed by the present invention, use of a fatty acid-modified rosin-based resin or rosin-modified alkyd resin, as the resin, allows for improvement of biomass content and other properties.

If the active energy ray-curable flexographic printing ink composition contains the aforementioned resin component, the content of the resin component in the active energy ray-curable flexographic printing ink composition may be 0 to 30.0% by mass, or preferably 0 to 20.0% by mass.

Adjusting the content of the resin component, if compounded, to the aforementioned range allows adhesion, scratch resistance, printability, etc., to be added to the active energy ray-curable flexographic printing ink composition.

If the content of the resin component exceeds 30.0% by mass, the solvent resistance of the active energy ray-curable flexographic printing ink composition tends to be negatively affected.

<Other Components>

The active energy ray-curable flexographic printing ink composition proposed by the present invention may contain other components.

Among such "other components," any known components capable of adding desired functions, properties, etc., to the aforementioned composition may be used without limitation, including, for example, polymerization inhibitor, solvent, surface-adjusting agent (leveling agent, slipping agent), anti-blocking agent, photostabilizer, defoaming agent, UV absorbent, infrared-absorbing agent, thickening agent (thixotropy agent), antibacterial/antifungal agent, etc.

(Polymerization Inhibitor)

The active energy ray-curable flexographic printing ink composition may contain any known polymerization inhibitor for the purpose of preventing polymerization during storage.

Polymerization inhibitors include, for example, p-methoxyphenol, catechol, tert-butylcatechol, butylhydroxytoluene, and other phenol compounds, hydroquinone, alkyl-substituted hydroquinone, phenothiazine, tocopherol acetate, nitrosamine, benzotriazole, hindered amine, etc.

If the active energy ray-curable flexographic printing ink composition contains a polymerization inhibitor, its content may be 0.01 to 1.0% by mass.

(Solvent)

The active energy ray-curable flexographic printing ink composition may contain any known solvent to lower viscosity and improve wettability/spreadability over the base material, for example.

Solvents include, for example, water, glycol monoacetates, glycol diacetates, glycol ethers, lactic acid esters, etc. Among these, water, tetraethylene glycol dialkyl ether, ethylene glycol monobutyl ether acetate, and diethyl diglycol are preferred.

If the active energy ray-curable flexographic printing ink composition contains a solvent, its content may be 0 to 50.0% by mass.

(Surface-Adjusting Agent)

The active energy ray-curable flexographic printing ink composition may contain any known surface-adjusting agent to improve leveling property and slipping property.

Among surface-adjusting agents, one or more types selected from the group that consists of silicon-based surface-adjusting agents, fluorine-based surface-adjusting agents, acrylic-based surface-adjusting agents, acetylene glycol-based surface-adjusting agents, etc., may be used, for example.

As for specific examples of surface-adjusting agents, one or more types selected from the group that consists of the BYK series manufactured by BYK-Chemie GmbH, TEGO series manufactured by Evonik Degussa Japan Co., Ltd., Polyflow series manufactured by Kyoeisha Chemical Co., Ltd., etc., may be used.

If the active energy ray-curable flexographic printing ink composition contains a surface-adjusting agent, its content may be 0.01 to 1% by mass.

[Method for Manufacturing]

The method for manufacturing the active energy ray-curable flexographic printing ink composition proposed by the present invention is not limited in any way, and any known method may be used.

For example, it may be prepared by adding all of the aforementioned components and then mixing them in a bead mill, triple roll mill, etc.

It may also be prepared by mixing the pigment, pigment dispersant, and various active energy ray-curable compounds to obtain a concentrated base beforehand, and then adding active energy ray-curable compounds, polymerization initiator, and if necessary, surfactant and other additives, to the concentrated base to achieve a desired composition.

In addition, it may also be prepared by mixing the aforementioned components and then kneading the mixture in a bead mill, triple roll mill, etc., to disperse the pigment (i.e., coloring component and extender pigment), followed by adding of additives (polymerization initiator, polymerization inhibitor, wax, and other additives, etc.) as necessary, and further by viscosity adjustment through addition of other components.

The viscosity of the active energy ray-curable flexographic printing ink composition proposed by the present invention, which is adjusted as deemed appropriate according to the purpose of use, etc., and not limited in any way, is 300 to 2,000 mPa·s, or preferably 500 to 1,500 mPa·s, for example.

The base material on which to print the active energy ray-curable flexographic printing ink composition proposed by the present invention may be plastic, paper, cartons, etc., or a laminate or other composite base material comprising multiples of these base materials.

Among these, one or more types selected from the group that consists of polyester-based polymers (such as polyethylene terephthalate (PET), polyethylene naphthalate, etc.), cellulose-based polymers (such as diacetyl cellulose, triacetyl cellulose (TAC), etc.), polycarbonate-based polymers, polyacrylic-based polymers (such as polymethylmethacrylate, etc.), vinyl chloride-based polymers, polyolefin-based polymers (such as polyethylene, polypropylene, polyolefin polymers having a cyclic or norbornene structure, ethylene-propylene copolymers, etc.), polyamide-based polymers (such as nylon, aromatic polyamide polymers, etc.), polystyrene-based polymers (such as polystyrene, acrylonitrile-styrene copolymers, etc.), polyimide-based polymers, polysulfone-based polymers, polyether sulfone-based polymers, polyether ketone-based polymers, polyphenyl sulfide-based polymers, polyvinyl alcohol-based polymers, polyvinylidene chloride-based polymers, polyvinyl butyral-based polymers, polyarylate-based polymers, polyoxymethylene-based polymers, polyepoxy-based polymers, blends of these polymers, etc., may be used as plastic base materials on which to print the active energy ray-curable flexographic printing ink composition proposed by the present invention.

To use the active energy ray-curable flexographic printing ink composition proposed by the present invention, the active energy ray-curable flexographic printing ink composition is printed on the base material with any known flexographic printing machine using anilox rolls, after which ultraviolet rays or other active energy ray is irradiated thereon, for example. This allows the active energy ray-curable flexographic printing ink composition on the base material (printing medium) to cure quickly.

EXAMPLES

The present invention is explained in greater detail below by providing examples; however, the present invention is not limited to the following examples. It should be noted that, unless otherwise specified, "percent" refers to "% by mass" and "part" refers to "part by mass." Additionally, the numbers indicating the quantities of respective materials in the table also represent "parts by mass." The unit of acid value is mgKOH/g.

(Active Energy Ray-curable Flexographic Printing Ink Compositions)

Pigments
   Carbon black
   C. I. Pigment Blue 15:4

Plant Oil-Modified Polyfunctional (Polyester) Oligomers
   Product name: EBECRYL 450 (manufactured by Daicel-Allnex Ltd., biomass content 30 percent)
   Product name: EBECRYL 452 (manufactured by Daicel-Allnex Ltd., biomass content 30 percent)
   Product name: AgiSyn 716 (manufactured by DSM-Agi Corporation, biomass content 30 percent)

Dispersant
   PB822 (AJISPER, manufactured by Ajinomoto Fine-Techno Co., Inc.)

Acrylamide Derivative
   Acryloyl morpholine

Other Photopolymerizable Compounds
   Rosin-modified epoxy acrylate Product name: UV22C (manufactured by Harima Chemicals Inc.)
   Dipentaerythritol pentaacrylate Product name: SR399 (manufactured by Sertomer Company Inc.)

Waxes
   Average particle size 1 to 2 μm Product name: SST-1MG (manufactured by Shamrock Technologies, Inc.)
   Average particle size 2 to 4 μm Product name: Fluo HT (manufactured by Micro Powders, Inc.)
   Average particle size 4 to 6 μm Product name: Ceridust 9202F (manufactured by Clariant Corp.)

Initiators
   TPO (acylphosphine oxide)
   BMS (4-benzoyl-4'-methyldiphenyl sulfide)
   EMK (ethyl Michler's ketone)

Polymerization Inhibitor
   Product name: IN510 (nitrosoamine, manufactured by Daido Chemical Corporation)

Surface-Adjusting Agent
   Product name: PDMS 1000J (manufactured by Momentive Performance Materials, Inc.)

Defoaming Agent
   Product name: AIREX 920 (manufactured by Evonik Industries AG)

(Preparation of Active Energy Ray-Curable Flexographic Printing Ink Compositions)

Mixtures, each compounded from pigment, dispersant, and/or photopolymerizable component(s), were dispersed in an Eiger mill (using zirconium beads of 0.5 mm in diameter as media) to obtain base compositions. The obtained base compositions were compounded, respectively, with other components to achieve the formulations (% by mass) shown in Table 1, and then mixed under agitation, to obtain the active energy ray-curable flexographic printing ink compositions in the Examples and Comparative Examples.

(Evaluation Methods)

Ink Viscosity
   Measured with a Discovery HR-2 rheometer manufactured by TA Instruments Inc., at a shear rate of 3,000 l/s (approx. 251 rpm).

<Ultraviolet Ray Curing>

Curability
   Upon color formation on a base material (synthetic paper) using an 800-lpi hand proofer;
     it was irradiated with ultraviolet rays (light source=metal halide lamp) in such a way that the irradiation intensity per irradiation (1 pass) became 120 W, 80 mJ. The number of irradiations needed to cure the ink was evaluated. When the ink no longer attached to the cotton swab rubbing the coating film after irradiation, the ink was considered cured.

Adhesion
   Upon color formation on base materials (PET and Yupo 80) using an 800-lpi hand proofer;
     it was irradiated with ultraviolet rays (light source=metal halide lamp) in such a way that the irradiation intensity per irradiation (1 pass) became 120 W, 80 mJ. A piece of Cellotape (registered trademark) manufactured by Nichiban Co., Ltd. was stuck on each obtained coating film, rubbed three times with a finger from above, and then peeled. The degree of removal of the coating film after peeling was visually observed, and the result was evaluated according to the evaluation criteria below.

(Evaluation Criteria)
   ○: The cured film did not peel.
   Δ: The cured film peeled, but the peeled area was under 20 percent.
   x: The peeled area of the cured film was 20 percent or greater.

Scratch Resistance
   Upon color formation on a base material (synthetic paper) using an 800-lpi hand proofer;
     it was irradiated with ultraviolet rays (light source=metal halide lamp) in such a way that the irradiation intensity per irradiation (1 pass) became 120 W, 80 mJ. The obtained coating film was rubbed with a fingernail to visually observe the coating film for scrape-off, and the result was evaluated according to the evaluation criteria below.

(Evaluation Criteria)
   ○: Scrape-off did not occur.
   Δ: Scrape-off occurred, but the base material was not visible.
   x: Scrape-off occurred, and the base material was visible.

Rub Resistance
   Upon color formation on a base material (synthetic paper) using an 800-lpi hand proofer;
     it was irradiated with ultraviolet rays (light source=metal halide lamp) in such a way that the irradiation intensity per irradiation (1 pass) became 120 W, 80 mJ. The obtained coating film was rubbed 1,000 times with a 200-g force using a patch fabric, being unbleached muslin No. 3, on a Gakushin-type color fastness tester, to visually observe the degree of removal of the cured film from the base material sheet, and the result was evaluated according to the criteria below.

(Evaluation Criteria)
   ○: The surface of the cured film was free from scratches.
   Δ: The surface of the cured film had scratches.
   x: The cured film was removed, and the sheet became visible.

<Electron Beam Curing>

Upon color formation on a base material (synthetic paper) using an 800-lpi hand proofer;

it was cured with an EB irradiation device at an acceleration voltage of 90 kV and irradiation dose of 30 kGy per irradiation (1 pass), to form a cured film. The evaluation was performed in the same manner as above involving ultraviolet ray curing.

TABLE 1

| | | Examples | | | | | | | | | | | | Comparative Examples | |
|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 |
| Pigments | Carbon black | 20 | 20 | 20 | 20 | 20 | 20 | 20 | 15 | | 20 | | | 20 | 20 |
| | PB15:4 | | | | | | | | | | | 20 | 20 | | |
| Dispersant: PB822 | | 3 | 3 | 3 | 3 | 3 | 3 | 2.5 | 2.3 | | 3 | 3 | 3 | 3 | 3 |
| Plant oil-modified polyfunctional (polyester) oligomer (biomass content 30%) | Ebecryl 450 | 35 | | | | 35 | 35 | 20 | 40 | | 15 | | | 15 | |
| | AgiSyn 716 | | 35 | 36.5 | 33.5 | | | | | 60 | | 35 | 45 | | |
| | Ebecryl 452 | | | | | | | | | | 20 | | | | |
| Acryloyl morpholine | | 24.8 | 24.8 | 24.8 | 24.8 | 24.8 | 24.8 | 40.8 | 26 | 26.8 | 24.8 | 24.8 | 26.3 | 34.8 | 24.8 |
| Rosin-modified epoxy acrylate | | 2 | 2 | 2 | 2 | 2 | 2 | 1.5 | 1.5 | | 2 | 2 | 2 | 2 | 2 |
| Dipentaerythritol pentaacrylate | | | | | | | | | | | | | | 13 | 35 |
| Waxes | Average particle size 1 to 2 μm | 3 | 3 | 1.5 | 4.5 | | | 3 | | 3 | 3 | | 3 | 0.5 | 3 |
| | Average particle size 2 to 4 μm | | | | | 3 | | | 3 | | | | | | |
| | Average particle size 4 to 6 μm | | | | | | 3 | | | | | 3 | | | |
| TPO | | 7 | 7 | 7 | 7 | 7 | 7 | 7 | 7 | 7 | 7 | 7 | | 7 | 7 |
| BMS | | 2.5 | 2.5 | 2.5 | 2.5 | 2.5 | 2.5 | 2.5 | 2.5 | 2.5 | 2.5 | 2.5 | | 2.5 | 2.5 |
| EMK | | 2 | 2 | 2 | 2 | 2 | 2 | 2 | 2 | | 2 | 2 | | 2 | 2 |
| Polymerization inhibitor (IN510) | | 0.1 | 0.1 | 0.1 | 0.1 | 0.1 | 0.1 | 0.1 | 0.1 | 0.1 | 0.1 | 0.1 | 0.1 | 0.1 | 0.1 |
| Defoaming agent (AIREX 920) | | 0.1 | 0.1 | 0.1 | 0.1 | 0.1 | 0.1 | 0.1 | 0.1 | 0.1 | 0.1 | 0.1 | 0.1 | 0.1 | 0.1 |
| Surface-adjusting agent (PDMS 1000J) | | 0.5 | 0.5 | 0.5 | 0.5 | 0.5 | 0.5 | 0.5 | 0.5 | 0.5 | 0.5 | 0.5 | 0.5 | | 0.5 |
| Total | | 100 | 100 | 100 | 100 | 100 | 100 | 100 | 100 | 100 | 100 | 100 | 100 | 100 | 100 |
| Viscosity (mPa·s) | | 1440 | 1480 | 1260 | 1650 | 1460 | 1450 | 670 | 1330 | 780 | 950 | 1280 | 1480 | 1290 | 1810 |
| Type of energy ray | | UV | UV | UV | UV | UV | UV | UV | UV | UV | UV | UV | Electron | UV | UV |
| Curability | | 1 pass | 1 pass | 1 pass | 1 pass | 1 pass | 1 pass | 1 pass | 1 pass | 1 pass | 1 pass | 1 pass | 1 pass | 1 pass | 1 pass |
| Adhesion | PET | ○ | ○ | ○ | ○ | ○ | ○ | ○ | ○ | ○ | ○ | ○ | ○ | x | x |
| | Yupo 80 | ○ | ○ | ○ | ○ | ○ | ○ | ○ | ○ | ○ | ○ | ○ | ○ | x | x |
| Scratch resistance | Yupo 80 | ○ | ○ | ○ | ○ | ○-Δ | ○-Δ | ○ | ○ | ○ | ○ | ○ | ○ | x | ○ |
| Rub resistance | 200 g × 1,000 times | ○ | ○ | ○ | ○ | ○ | ○ | ○ | ○ | ○ | ○ | ○ | ○ | x | x |

According to Examples 1 to 12 conforming to the present invention, active energy ray-curable flexographic printing ink compositions demonstrating excellent curability under both ultraviolet rays and electron beam, as well as excellent adhesion, scratch resistance, and rub resistance of the cured coating film, could be achieved.

By contrast, Comparative Example 1 representing an ink composition containing less plant oil-modified polyfunctional (polyester) oligomer resulted in poor properties except for curability. Also, Comparative Example 2 representing an ink composition in which no plant oil-modified polyfunctional (polyester) oligomer was compounded, resulted in poor properties except for curability and scratch resistance.

What is claimed is:

1. An active energy ray-curable flexographic printing ink composition which comprises:

a plant oil-modified polyfunctional polyester oligomer by 20.0 to 70.0% by mass in the ink composition, an acrylamide derivative by 20.0 to 45.0% by mass in the ink composition, and a wax of 8.0 μm or smaller in average particle size by 1.0 to 5.0% by mass in the ink composition; and has a viscosity of 300 to 2,000 mPa·s.

2. The active energy ray-curable flexographic printing ink composition according to claim 1, which further comprises a surface adjusting agent by 0.01 to 1.00% by mass in the ink composition.

3. The active energy ray-curable flexographic printing ink composition according to claim 1, which further comprises a colorant.

4. The active energy ray-curable flexographic printing ink composition according to claim 2, which further comprises a colorant.

* * * * *